Nov. 24, 1931.  F. PATRONO ET AL  1,833,853
CONVEYING MEANS FOR MACARONI DRIERS
Filed March 1, 1929
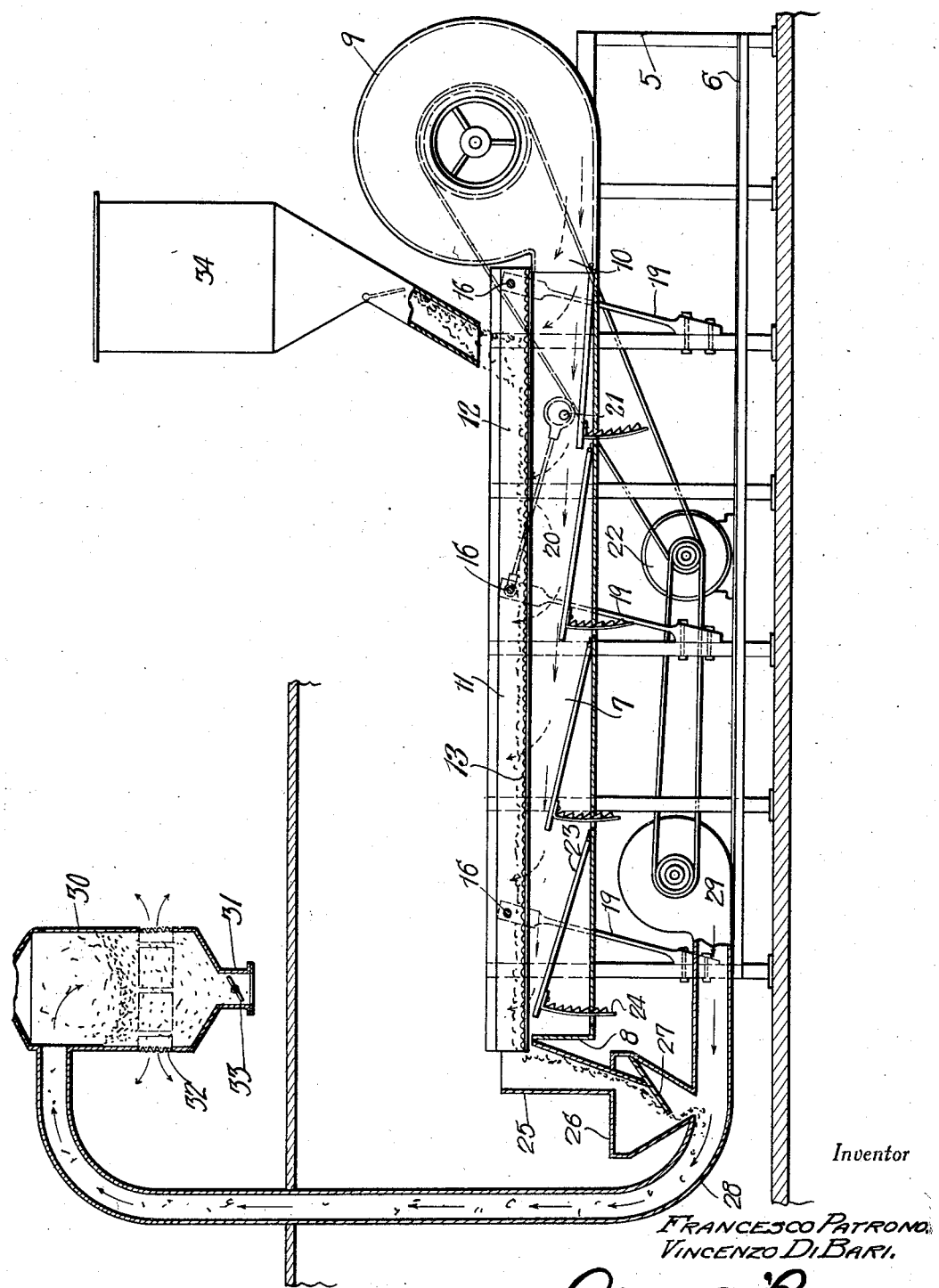
Inventor
FRANCESCO PATRONO,
VINCENZO DI BARI.
By Clarence A. O'Brien
Attorney Patented Nov. 24, 1931

1,833,853

UNITED STATES PATENT OFFICE

FRANCESCO PATRONO AND VINCENZO DI BARI, OF MOUNT VERNON, NEW YORK, ASSIGNORS TO THE INDEPENDENT MACARONI COMPANY, INC., OF MOUNT VERNON, NEW YORK

CONVEYING MEANS FOR MACARONI DRIERS

Application filed March 1, 1929. Serial No. 343,728.

This invention relates to machines for use in the drying of macaroni, spaghetti, vermicelli and other materials originally in a plastic state, and has for its object, the provision of such a machine that is highly efficient in use and generally simple in its construction, and that will rapidly and thoroughly remove all moisture from the materials passed therethrough.

Furthermore, the invention aims to provide a machine of the foregoing character wherein the moist material is passed therein from one floor of the building and after being dried, is forced to an upper floor and received in thoroughly dried condition in bins, boxes or other suitable containers.

With the foregoing and other objects in view as the nature of the invention will be better understood from the following specification and accompanying drawing, wherein:

The figure is a detailed longitudinal sectional view through the entire device.

Now having particular reference to the drawing, the machine consists of a suitable frame structure arranged in horizontal position upon one floor of the building housing the apparatus. This frame preferably is comprised of spaced vertical side bars 5 interconnected adjacent their upper and lower ends by longitudinally extending channel bars 6. Arranged longitudinally and on a horizontal plane within the upper portion of the frame structure is an air box 7, open at its top side and rear end. Arising from the bottom wall of the box at its front end is a perpendicular wall 8 that terminates beneath the open top of the box. The rear end of this box 7 terminates in spaced relation with the rear end of the frame structure, while associated with the frame structure at said rear end of the air box is a suitable blower 9, the outlet mouth 10 of which communicates with the adjacent end of the air box at a point below the open top thereof. The intake opening or openings of this blower is or are preferably located adjacent the building furnace room or any suitable source of warm or hot air supply so that warm air will be directed through the air box.

Located within the open top of the air box 7 above said perpendicular wall 8 and the outlet mouth 10 of the blower 9 is a shaker screen 11, which preferably consists of a pair of side channel bars 12—12, that support a bottom wall of foraminous material, such as wire screening or the like 13. Shafts 16 extend transversely of the screen 11 and are operatively connected to one of the ends of resilient bars 19 which have their opposite ends anchored to certain of the bars 5 of the machine frame. Associated with the ends of one of the shafts are certain ends of connecting rods 20—20, the opposite ends thereof being eccentrically associated with a power shaft 21, with one of which is associated a motor or suitable power plant 22. Obviously, during the operation of the power plant, the rotation of the shaft 21 will cause the reciprocation of the connecting rods 20, and in turn, the arcuate motion of its connected shaft 16, thus bringing about the shaking action of the screen 11.

In order that the air from the blower 9 will be distributed in substantially uniform manner throughout the entire length of the screen 11, there is located within the air box 7 beneath said screen, four air deflector boards 23. These boards may be hinged or laid loosely at their inner ends upon the bottom wall of the air box 7 adjacent the blower 9. The opposite end of each deflector is equipped with any suitable means such as that indicated by the reference character 24, whereby the inclination of the board towards the outlet end of the shaker screen may be properly regulated to bring about the uniform passage of the air through the screen, and consequently, through the macaroni or other material thereon.

At the outlet end of the shaker screen 11 is a receiving mouth 25, the rear wall of which is inclined and extends into a trough 26, communicating with the lower end of said mouth. Furthermore, there is located within the trough 26 and directly beneath the inclined rear wall of said mouth, an inclined baffle plate 27, the forward end of which terminates in slight spaced relation with the forward wall of said trough. The lower open end of this trough 26 communicates with a conveyor pipe 28 while communicating therewith at its inner end is a blower 29. This pipe 28 extends vertically through one or more floors of the building and in communication with the extreme upper end thereof is a dried material receiver 30. This receiver 30 is located on a vertical plane, and is preferably in the form of a cylinder having an outlet opening at its upper end and a material discharge mouth 31 at its lower end. The pipe 28 communicates with this receiver adjacent its upper end, so that the macaroni will be caught in the receiver, and a considerable proportion of the air will pass through the opening at the upper end thereof. Adjacent the bottom of the receiver there is provided a plurality of wire screened openings 32, so that the air that has not escaped through the upper end of the receiver will pass therethrough. If desired, a suitable control valve 33 may be located within the discharge end of the receiver, and obviously, the dried material discharged is caught within suitable bins, boxes or the like.

Suitable means is provided between said power shaft 21 and the shafts of the blades of the blowers 9 and 29 whereby to cause the simultaneous operation of the blowers and the shaker screen. Furthermore, any suitable means such as 34 may be provided for causing the flow of the material to be dried onto the screen 11 at a point adjacent the main blower 9.

In view of the foregoing description when considered in conjunction with the accompanying drawings, it will be apparent that we have provided a novel, simple and efficient apparatus for the drying of macaroni and similar materials, and even though we have herein shown and described the invention as consisting of certain detailed structural elements, it is nevertheless to be understood that some changes may be made therein without affecting the spirit and scope of the appended claim.

Having thus described our invention, what we claim as new and desire to secure by Letters Patent, is:

In a machine of the class described, a conveyor pipe, a blower at one end of said conveyor pipe, a hopper having opposed downwardly and inwardly inclined side walls and opening into said conveyor pipe, and overlapping upper and lower inclined baffle plates in said hopper extending from the same inclined wall thereof to a point in spaced relation to the opposite inclined wall to direct the gravitational flow of material deposited in said hopper on to the last mentioned inclined wall prior to its passage through said opening.

In testimony whereof we affix our signatures.

FRANCESCO PATRONO. [L. S.]
VINCENZO DI BARI. [L. S.]